United States Patent [19]

Selim et al.

[11] Patent Number: 4,688,171
[45] Date of Patent: Aug. 18, 1987

[54] SERIAL BUS FOR MASTER/SLAVE COMPUTER SYSTEM

[75] Inventors: Ahmed E. Selim, Haledon; Thomas O. Weilbacker, Northvale, both of N.J.

[73] Assignee: Allied Corporation, Morris Township, Morris County, N.J.

[21] Appl. No.: 513,542

[22] Filed: Jul. 13, 1983

[51] Int. Cl.⁴ .............................................. G06F 13/40
[52] U.S. Cl. .................................................... 364/200
[58] Field of Search ... 364/200 MS File, 900 MS File

[56] References Cited

U.S. PATENT DOCUMENTS 4,388,683 6/1983 Beifuss et al. ........................ 364/200

Primary Examiner—Thomas M. Heckler
Attorney, Agent, or Firm—Stanley N. Protigal; Howard G. Massung

[57] ABSTRACT

A serial to parallel bus converter (11) enables a slave computer (13), having a parallel bus input (19) to be controlled by a master computer (15) via a serial bus connection (14). The converter (11) interprets commands from the master computer (15) to provide appropriate control commands for the slave computer (13). Instructions received from the master computer (15) are provided to the slave computer (13) when complete commands from the master computer (15) are received by the converter (11). The converter (11) uses an intermediate bus (29), which is connected to the RAMs (27), ports (41-44) and a control register (45) for communicating with the slave computer (13), a UART port (31) for communicating with the master computer (15), a microprocessor (25) and a programmable read only memory (PROM) (33) for the microprocessor (25).

Advantages include a capability of directly programming the slave computer (13) from the master computer (15), and the ability to verify transmission between the master computer (15) and the slave computer (13). The system has an ability to use serial transmissions between the computers (13,15), even though the slave computer (13) may not have serial data transmission capabilities, by using the converter (11) as a buffer.

17 Claims, 4 Drawing Figures

| | |
|---|---|
| 1 | LENGTH IN BYTES |
| 2 | COMMAND |
| | OPTIONAL DATA |
| | ⋮ |
| | CHECKSUM (LSH) |
| i | CHECKSUM (MSH) |

*FIG. 3A*

| | |
|---|---|
| 1 | LENGTH IN BYTES |
| 2 | STATUS |
| | OPTIONAL DATA |
| | ⋮ |
| | CHECKSUM (LSH) |
| i | CHECKSUM (MSH) |

*FIG. 3B*

SERIAL BUS FOR MASTER/SLAVE COMPUTER SYSTEM

BACKGROUND OF THE INVENTION

The present invention relates to data systems, and in particular, to a slave computer which can be remotely controlled by a master computer via a small number of electrical connections.

It is known to employ a computer to control various equipment such as test instruments for monitoring a unit under test. Such systems have included peripheral units for programming the computer. For example, a computing system could include a group of parallel bit switches for manually sending single word instructions. These manual switches can cooperate with other control switches for interrupting the computer. Such systems have included teletypewriters having tape readers for originally programming the computer. A disadvantage of such systems is that reprogramming and debugging can be very time consuming because of the tape reader and manual switches employed.

One solution has been the provision of a link for exchanging data between a master and slave computer. An interface was used to bring each computer's control and information lines into compatibility. In this arrangement, the slave computer is used to control the test equipment and obtain information from the test equipment. The slave computer can be reprogrammed via the interface without the necessity of transferring tape from one computer to the next. Such an arrangement allows the slave computer to control the various test equipment while the slave computer itself is controlled by, and sending information to, the master computer.

One problem with such an arrangement is that the master computer must be connected via data lines to the slave computer. Where short distances are involved, this merely involves handling heavy cables. On the other hand, these data lines place severe restrictions on the distances at which communications can be established between the master and slave computers. As an alternative, software changes have been made by providing program information in recorded form.

In order to reduce the dependency of a slave computer on the physical location of the master computer, it is desired to use a serial bus as a data communications link between the master and slave computers. Such a serial data bus would enable one, through the use of modems, to transmit data over ordinary telephone lines. This would greatly facilitate a remote location of a slave computer by allowing such a slave computer to be moved to a remote location while allowing the master computer to remain stationary.

In the modifying a slave computer's program, it is often necessary to obtain data from the slave computer. This is particularly important when the master-slave computer arrangement is used for interactive debugging. When a slave computer is attempting to transfer information to and from a master computer, the use of a serial line bus presents restrictions on the amount of data which may be simultaneously transmitted. In order to overcome these difficulties, the information transmitted must be translated before being transferred between the bus and the operating program of the slave computer. If the slave computer must perform such time queuing functions, then a portion of its memory and its programming must be used for that purpose. For this reason, it is desirable that an interface between a serial bus and a computer be capable of performing its own time queuing functions and be able to transfer information between the serial bus and the slave computer in forms which are compatible with the real-time operation of both.

SUMMARY OF THE INVENTION

This invention contemplates an interface between a computer and a serial bus in which the computer receives and provides information through a timing and control network. The network provides the computer with, and receives from the computer, information from an intermediate bus through a plurality of ports. A microprocessor and memories are also connected to the bus, so that the microprocessor can control the port in such a way that information is provided in a predetermined format. Program and data memories use the same bus for data storage. This allows the microprocessor to use information passing to and from the network in order to control the network and computer. A separate input/output port is used to transfer information to and from a serial bus. The same intermediate bus is, therefore, used to connect program storage and data store memories, as well as to transfer information received via the separate input/output port and the plurality of ports. This system may be further connected to a modem at the serial bus.

BRIEF DESCRIPTION OF THE DRAWINGS

FIGS. 3A and 3B shows the format for data to be generated in the preferred operation of the circuit of FIG. 1.

DETAILED DESCRIPTION OF THE PREFERRED EMBODIMENT

Figure 1:
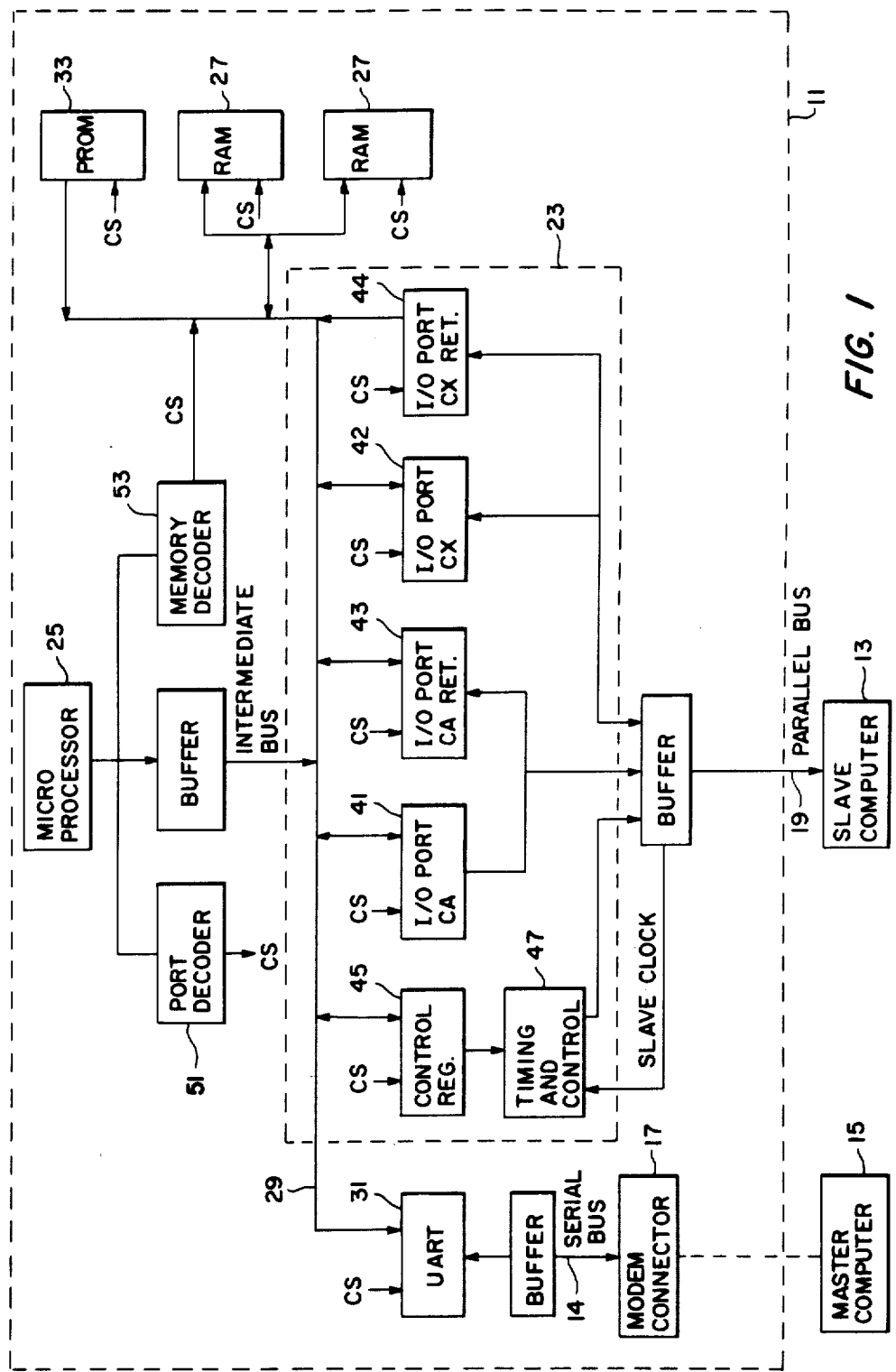
FIG. 1 is a block diagram showing a computer interface circuit constructed in accordance with the invention.

A block diagram of a parallel to serial bus converter 11 is shown in FIG. 1. The converter 11 is connected to a slave computer 13, and has a serial bus 14, which is used for providing connections to a master computer 15. The connection to the master computer 15 may be by direct connection to the bus 14, or by the use of modems (not shown), one of which is connected to the bus 14 by use of a modem connector 17. The slave computer 13 is connected to the parallel-to-serial bus converter 11 by means of a parallel bus 19.

In the preferred embodiment, the slave computer 13 is a 21 bit computer used to control automated test equipment in an avionics intermediate shop and is a part of a computer control and display panel. The master computer 15 is generally used for software development for supporting the slave computer 13. Software is then transferred from the master computer 15 to the slave computer 13. The master computer 15 also is used to test the slave computer 13 and its associated test equipment (not shown). With the present invention, such testing would include interactive testing of the slave computer 13 and associated equipment. The present invention is, of course, adaptable to a wide variety of master-slave computer applications.

Still referring to FIG. 1, information passing between the master computer 15 and the slave computer 13 is converted from a serial to a parallel mode and vice versa at an interface circuit 23. The interface circuit 23 is controlled by a microprocessor 25 and is able to store information in a pair of random access memories (RAMs) 27. An intermediate bus 29 is used for a connection between the interface circuit 23, the microprocessor 25, and a universal asynchronous receiver-transmitter (UART) 31, which is a serial in/out port. The UART 31 is connected to the serial bus 14. A programmable read only memory 33 (PROM) is also connected to the intermediate bus 29 and is used to firm wire program the microprocessor 25.

Information passing from the master computer 15 to the slave computer 13 enters the converter through the modem connector 17 and serial bus 14. The information is received at the UART 31 and provided to the intermediate bus 29. The information is transferred through a buffer 34 to the slave computer 13 via two of the four in/out ports (I/O ports) 41-44. Specifically, I/O ports 41 and 42 are used to transmit information going from the master computer 15 to the slave computer 13. I/O ports 41 and 42 provide data and control information, respectively, to and from the slave computer 13. The information is then provided to the parallel bus 19 which, in the preferred embodiment, is a 21 bit bus. The information is stored in the RAMs 27 prior to passing through I/O ports 41 and 42 in order that the microprocessor 25 has a chance to control which ports 41,42 are used for transferring the information. A control register 45 and a timing and control network 47 sequence the transfer of information from I/O ports 41 and 42 and provides that information to appropriate terminals at the parallel bus 19.

Likewise, the return information from the slave computer 13 is provided to the master computer 15 by passing through the interface circuit 23 from the parallel bus 19. Ports 43 and 44 are return ports used to verify the supply of information to, and supply the information from, the slave computer 13.

Information entering the intermediate bus 29 is stored at the RAMs 27. The information stored at the RAMs 27 is serially supplied via the intermediate bus 29 to UART 31, from which it is supplied to the master computer 15 via the serial bus 14 and to I/O ports 41 and 42. In order to provide an orderly flow of information from and to the master computer 15 via the serial bus 14, the microprocessor 25 controls the flow of information to the I/O ports 41-44, UART 31, into control register 45 and into an out of storage in the RAMs 27.

The timing and control circuit 47 may employ a group of registers, flip-flops or other sequential or combinational logic circuits to render the interface circuit 23 compatible with the slave computer 13 and the balance of the circuitry shown in FIG. 1. In certain simplified, highly compatible embodiments, the timing and control circuit 47 may be a series of directly wired connections.

Microprocessor 25 can be generally programmed by storing the desired instructions into the PROM 33 so that data and instructions from the master computer transmitted through the modem connector 17 are received, translated and relayed by the microprocessor 25 through the interface circuit 23 and the parallel bus 19 to control the slave computer in an orderly manner to be described. The microprocessor 25 uses a port decoder 51 for controlling the ports 41-44, the control register 45 and the UART 31. A like part is used as a memory decoder 53 for controlling the PROM 33 and the RAMs 27. The decoders 51,53 are connected, in a manner known to those skilled in the art of computer electronics, with control connections CS providing control signals to the UART 31, I/O ports 41-44, register 45 and memories 27,33.

In the preferred embodiment, the microprocessor 25 is an 8085 microprocessor, made by Intel Corporation, Santa Clara, Calif. The I/O ports 41-44 are 8255 ports and the UART 31 is an 8251 USART (universal synchronous asynchronous receiver-transmitter) port, each sold by Intel. The control register 45 is a 74LS273 register, sold by Fairchild Semiconductor, Mountain View, Calif. The PROM 33 is a 2764 PROM and the RAMs 27 are 2114A RAMs, each of which is also made by Fairchild Semiconductor. It is anticipated that, as the bus converter 11 is placed into production, other component parts may be substituted for the component parts described.

Figure 2:
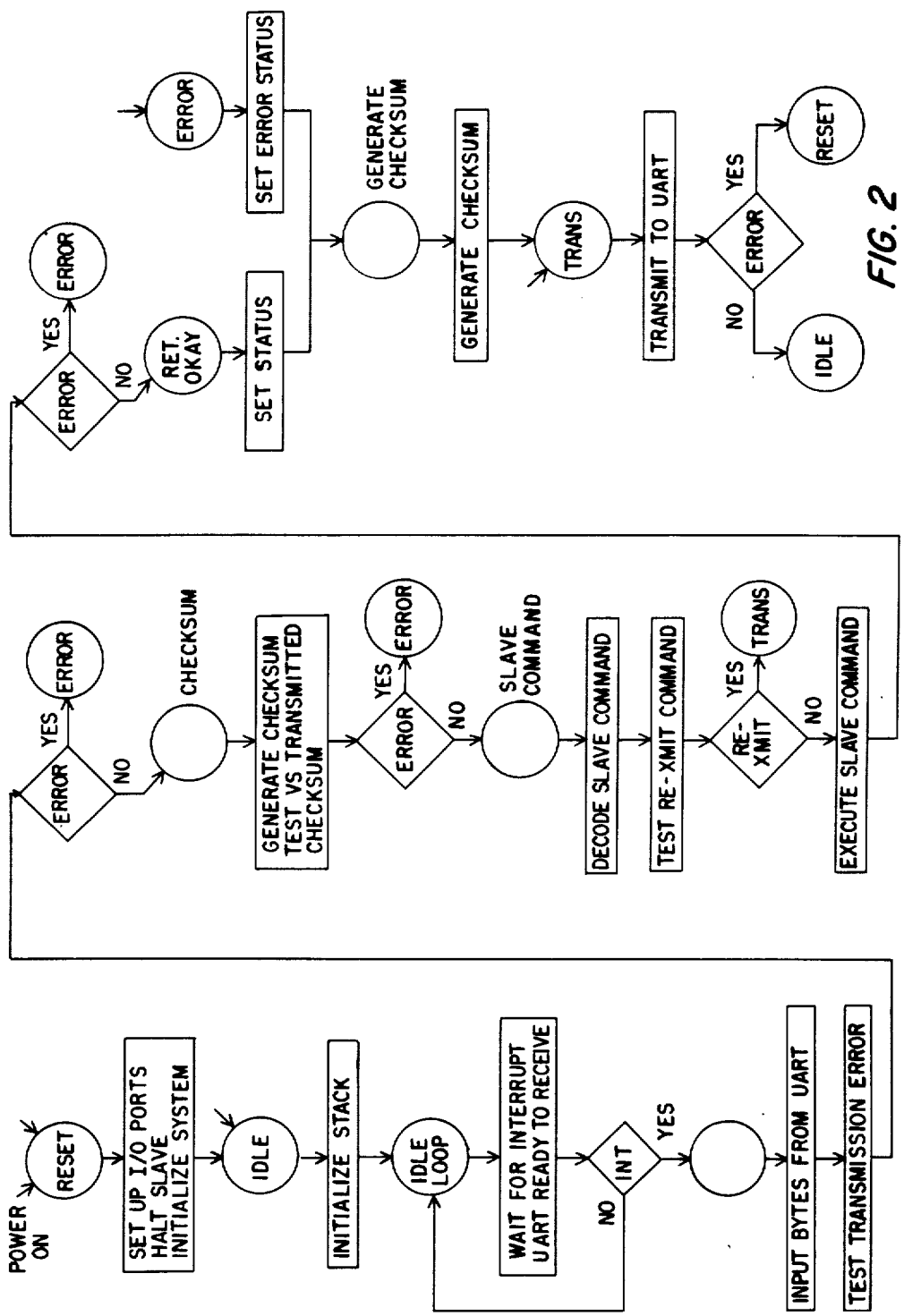
FIG. 2 is a flow diagram describing a preferred operation of the circuitry of FIG. 1.

The microprocessor 25 is programmed to control the information in accordance with commands from the master computer 15. In FIG. 2, a flow diagram of the program is shown. As can be seen, the program ensures that information received from the master computer 15 is transferred to the slave computer 13 in a manner compatible with the slave computer 13. A typical program used by the applicants to accomplish these purposes follows the flow diagram of FIG. 2.

Referring to FIG. 2, when the system is turned on, it enters a reset routine and goes to an initial idle state. The RAMs 27 are then initialized, thereby effectively clearing memory. The system enters an idle loop routine, where it waits for an interrupt, with the program continously flowing in the idle loop until such interrupt is received. At this stage, the UART 31 is able to receive a command from the master computer 15. When the interrupt has been received, as indicated by logic block INT, the command from the master computer is provided through the UART 31 to the intermediate bus 29. A checksum is then generated and this checksum is compared to a checksum from the transmission in order to verify receipt of a complete transmission. If the checksums match, the transmission is presumed to be complete and not in error, and is provided to the slave computer 13 as a slave command. Upon executing the slave command, the slave computer 13 provides a return, which indicates whether the slave command is perceived as an error. If the slave command is not considered to be an error, then the return is considered to be okay and the return is provided in an acceptable format to be transmitted. The return is then transmitted to the master computer 15 through the UART 31.

After command sequence, the master computer may request a re-transmission. In that event, the request for a re-transmission is transmitted to the UART 31 from the master computer 13. Likewise, if an error is detected, an error command is transmitted, along with the appropriate error data.

If the transmission is received properly, the program returns to the idle sequence, in which the stack is initialized and the program enters the idle loop. If an error is transmitted, the system will automatically reset.

All communications between the master computer 15 and the converter 11 are preferably initiated by the master computer. The communication sequence would then take the form of a transmission block of bytes from the master computer 15 to the converter 11, followed by a response transmission of a block of bytes from the converter 11 to the master computer 15. Communication with the slave computer 13 would occur between the time of transmission from the master computer 15 to the converter 11 and the time of transmission from the converter 11 to the master computer 15.

The format of each byte will preferably be eight bits, including seven information bits and one parity bit. The parity bit is considered to be invisible because it is generated and/or tested by UART 31 or a comparable component in the master computer. The format of transmissions through the serial bus 14 to the UART 31 is shown in FIG. 3A, where each byte consisting of eight bits is represented by a horizontal space. The first byte gives the number of bytes in the remaining transmission, not including itself. The second byte contains the command that the converter 11 is to execute. Thus, this second byte is the instruction for the microprocessor 25 to execute. Depending on the specific command, optional data bytes may be included. The last two bytes are a double precision checksum of all bytes except the checksum bytes themselves.

The converter 11 uses the transmission length byte as a guide to the number of bytes expected for the communication. The converter also tests for a parity error in each byte and determines whether the number of bytes are less than the byte count. If an error is detected, the converter 11 sends an appropriate return transmission without executing the command. When a transmission is received with no parity or length errors, the converter 11 generates a checksum and compares that checksum against the transmitted checksum. If an error is detected, the converter 11 goes to the error sequence and returns a transmission without executing the command.

When a transmission is received with no such errors, the converter 11 decodes the command and re-formats the transmission where necessary. The converter 11 then sets up the I/O ports 41-44 and synchronizes with the slave computer's 13 clock. The converter 11 then transmits or receives data to or from the slave computer 13.

At the completion of the command, the converter 11 re-formats data received from the slave computer, sets up status and returns a transmission to the master computer 15. The status may indicate an error. The format of the return transmission is shown in FIG. 3B. In this case, a second byte indicating a status is similar to a command, except that the status is being transmitted from the converter 11 to the master computer 15.

The master computer 15 tests for parity errors, length errors, and checksum errors, much the same as is done by the converter 11. If a parity, byte length or checksum error is detected, the master computer 15 can transmit to the converter 11 a command asking for a re-transmission of the previous transmission.

If none of the above errors have been detected, the master computer 15 must test the status word return from the converter 11. If no error is indicated, the command is complete. On the other hand, if the status word indicates an error, the master computer 15 may send another transmission through the converter 11, asking for an extended status. A return transmission from the converter 11 includes a series of status reports in the "optional data" bytes. The second byte is merely an indication that the optional data being transmitted includes status reports. Upon receipt of the extended status, the master computer 15 can re-transmit the command, such as would be the case in the event of an error originating in the UART 31, or can report the error to an operator. Specific commands from the master computer 15 may include such commands as to display a particular register, to display all registers, to load registers, and other test and sequencing commands as appropriate.

It should be clear from the above description of the preferred embodiment that various changes may be made to the above described invention without departing from the inventive concepts therein. For example, a test port (not shown) for the control register is expected to be included in the production model of the converter. For this reason, it is desired that the invention be read as limited only by the claims.

What is claimed is:

1. In a system in which a first computer is used to control operation of a second computer, an interface circuit characterized by:
   (a) a first computer bus communicating with the first computer;
   (b) a second computer bus communicating with the second computer;
   (c) an intermediate bus;
   (d) at least one port means connecting the intermediate bus and the first computer bus;
   (e) at least one additional port means connecting the intermediate bus and the second computer via the second computer bus;
   (f) timing and control means, connected to the intermediate bus and to the second computer bus;
   (g) digital processor means connected to the intermediate bus and controlling the ports and the timing and control means in response to control information from the first computer;
   (h) memory means connected to the digital processor means for storing information appearing on the intermediate bus, the processor means controlling a transfer of information from the memory means to the intermediate bus such that, when the information fits within predetermined criteria, the information is transferred from the memory means to one of the computer buses through one of the ports.

2. Apparatus as described in claim 1, further characterized by:
   at least one return port means connected to the said one port means connected to the second computer bus, the return port means also being connected to the intermediate bus, and the return port means transferring from the second computer an indication of information provided to the second computer.

3. Apparatus as described in claim 2, further characterized by:
   said indication from the return port providing a verification of information through said additional port means.

4. Apparatus as described in claim 1, further characterized by:
   the port connected to the intermediate bus and the first computer bus being a universal asynchronous receiver-transmitter (UART).

5. Apparatus as described in claim 1, further characterized by:
   the memory means including at least one random access memory (RAM).

6. Apparatus as described in claim 5, further characterized by:
   the RAM being connected to the intermediate bus.

7. Apparatus as described in claim 5, further characterized by:

a programmable read only memory (PROM) providing program storage for the processor means.

8. Apparatus as described in claim 6, further characterized by:
a programmable read only memory (PROM) providing program storage for the processor means; and
the PROM being connected to the intermediate bus for communication with the processor means.

9. Apparatus as described in claim 1, further characterized by:
said one port means connecting the intermediate bus and the second computer and transferring control information to the second computer;
a second port means connected to the intermediate bus and to the second computer via the second computer bus, the second port means transferring data information to the second computer;
each of said port means connecting the intermediate bus and the second computer having at least one return port associated with it, the return port means also being connecting to the intermediate bus and the second computer, and transferring from the second computer indications of information transmitted to the second computer; and
the port means communicating with a first computer including a universal asynchronous receiver-transmitter (UART).

10. Apparatus as described in claim 8, further characterized by:
said one port means connecting the intermediate bus and the second computer and transferring control information to the second computer;
a second port means connected to the intermediate bus and to the second computer via the second computer bus, the second port means transferring data information to the second computer;
each of said port means connecting the intermediate bus and the second computer having at least one return port associated with it, the return port means also being connecting to the intermediate bus and the second computer, and transferring from the second computer indications of information transmitted to the second computer; and
the port means communicating with a first computer including a universal asynchronous receiver-transmitter (UART).

11. Apparatus as described in claim 1, further characterized by the information being transmitted to and from the first computer by following a format in which:
(a) a first portion of the information provides an indication of a length of the transmission;
(b) a second portion of the transmission includes an indication of the type of transmission;
(c) at least one final portion of the transmission including a checksum; and
(d) data may be provided in one or more portions of information between the portion indicating the type of transmission and the checksum.

12. Apparatus as described in claim 11, further characterized by:
each portion of information being a byte consisting of eight bits; and
the checksum being included in two bytes.

13. In a system in which a first computer is used to communicate in a serial transmission mode with a second computer having a parallel bus capability, an interface circuit characterized by:
(a) a first computer bus communicating with the first computer;
(b) a second computer bus communicating with the second computer;
(c) an intermediate bus;
(d) at least one serial port means connecting the intermediate bus and the first computer bus;
(e) at least one parallel port means connecting the intermediate bus and the second computer via the second computer bus;
(f) timing and control means, connected to the intermediate bus and to the second computer bus;
(g) digital processor means connected to the intermediate bus and controlling the ports and the timing and control means in response to control information from the first computer;
(h) memory means connected to the processor for storing information appearing on the intermediate bus, the processor means controlling a transfer of information from the memory means to the intermediate bus such that, when the information fits within predetermined criteria, the information is transferred from the memory means to one of the computer buses through one of the ports.

14. Apparatus as described in claim 13, further characterized by:
at least one return port means connected to the second computer bus, the return port means also being connected to the intermediate bus, and the return port means transferring from the second computer an indication of information provided to the second computer.

15. Apparatus as described in claim 13, further characterized by:
the memory means including at least one random access memory (RAM).

16. Apparatus as described in claim 15, further characterized by:
a programmable read only memory (PROM) providing program storage for the processor means; and
the PROM being connected to the intermediate bus for communication with the processor means.

17. Apparatus as described in claim 13, further characterized by:
said one port means connecting the intermediate bus and the second computer and transferring control information to the second computer;
a second port means connected to the intermediate bus and to the second computer via the second computer bus, the second port means transferring data information to the second computer;
each of said port means connecting the intermediate bus and the second computer having at least one return port associated with it, the return port means also being connecting to the intermediate bus and the second computer, and transferring from the second computer indications of information transmitted to the second computer; and
the port means communicating with a first computer including a universal asynchronous receiver-transmitter (UART).

* * * * *